United States Patent
Dai et al.

(10) Patent No.: US 7,997,090 B2
(45) Date of Patent: Aug. 16, 2011

(54) AIR CONDITIONING SYSTEM, METHOD OF OPERATION THEREOF, AND VEHICLE USING THE SAME

(75) Inventors: Lung Dai, Taipei Hsien (TW); Wang-Chang Duan, Shenzhen (CN); Bang-Sheng Zuo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 464 days.

(21) Appl. No.: 12/346,870

(22) Filed: Dec. 31, 2008

(65) Prior Publication Data

US 2009/0188267 A1 Jul. 30, 2009

(30) Foreign Application Priority Data

Jan. 30, 2008 (CN) .......................... 2008 1 0300261

(51) Int. Cl.
*F25D 17/06* (2006.01)
(52) U.S. Cl. ............................................. 62/89; 62/239
(58) Field of Classification Search .............. 62/89, 239, 62/309, 310, 389, 427, 455; 454/99, 139, 454/205, 228; 340/539.23, 539.26, 539.28
See application file for complete search history.

(56) References Cited

U.S. PATENT DOCUMENTS

| | | | | |
|---|---|---|---|---|
| 3,651,452 A * | 3/1972 | Friedman | ...................... | 340/938 |
| 3,783,446 A * | 1/1974 | McGimpsey | .................. | 340/917 |
| 3,818,429 A * | 6/1974 | Meyer et al. | ................... | 340/910 |
| 4,300,116 A * | 11/1981 | Stahovec | ...................... | 340/904 |
| 4,478,049 A | 10/1984 | Fukui et al. | | |
| 4,947,759 A * | 8/1990 | Uhl | ................................ | 104/299 |
| 5,259,813 A | 11/1993 | Abthoff et al. | | |
| 5,451,788 A * | 9/1995 | Pollack | ...................... | 250/361 C |
| 5,621,195 A * | 4/1997 | Taylor et al. | ................... | 177/133 |
| 5,971,844 A | 10/1999 | Samukawa et al. | | |
| 6,711,399 B1 * | 3/2004 | Granier | ...................... | 455/404.1 |
| 2002/0111768 A1 * | 8/2002 | Ghorayeb et al. | ............ | 702/178 |
| 2005/0128133 A1 * | 6/2005 | Samukawa et al. | ............. | 342/70 |
| 2007/0243808 A1 | 10/2007 | Mathur et al. | | |

FOREIGN PATENT DOCUMENTS

WO 8906608 A1 7/1989

* cited by examiner

*Primary Examiner* — Mohammad Ali
(74) *Attorney, Agent, or Firm* — Frank R. Niranjan

(57) ABSTRACT

An air conditioning system providing cooled air to a vehicle includes a detection device, a control module, and an air adjusting module. The detection device determines whether another vehicle is in front of the vehicle within a predetermined distance, and sends a signal when the other vehicle is detected. The control module is coupled to the detection device and controls the air adjusting module to operate in a recirculation mode upon receiving the signal.

14 Claims, 6 Drawing Sheets

AIR CONDITIONING SYSTEM, METHOD OF OPERATION THEREOF, AND VEHICLE USING THE SAME

BACKGROUND

1. Technical Field

The present disclosure relates to air conditioning systems, and particularly to an air conditioning system used in a vehicle.

2. Description of Related Art

Air conditioning systems (A/C systems) are well known in the art, operating on the principle of evaporation and condensation to provide cooled air in indoor areas, including vehicle interiors.

Often, vehicle A/C systems can be manually switched between a ventilation mode, in which an inside air inlet is closed and an outside air inlet opened, drawing fresh air into the interior of the vehicle, and recirculation mode, in which the inside air inlet is opened and the outside inlet closed, recirculating air within the interior of the vehicle.

However, in city driving, exterior air quality is often poor, especially in conditions of heavy traffic. If ventilation mode is utilized, air introduced to the vehicle interior can easily contain numerous contaminants such as vehicle exhaust emissions. While the emissions can be routed through a filtering system, net effect is often less than ideal, resulting in an unpleasant environment being created inside the vehicle.

Thus, an air conditioning system providing reliable exclusion of exhaust emission from other vehicles or the user's vehicle, a method of operating the system, and a vehicle using the air conditioning system, are desired.

DETAILED DESCRIPTION

Figure 1:
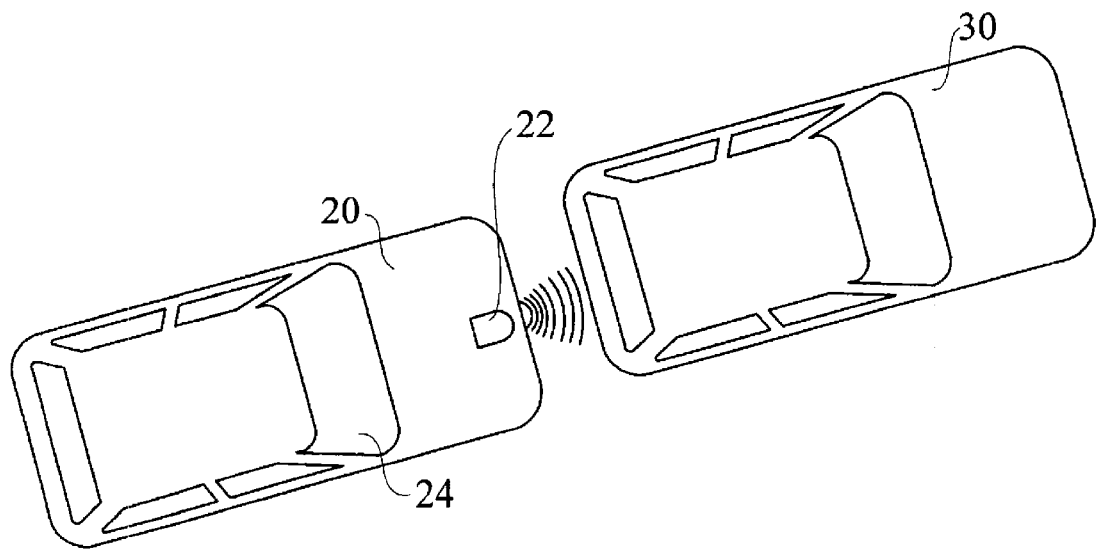
FIG. 1 is a schematic view of two vehicles with air conditioning systems in accordance with an exemplary embodiment.
Figure 2:
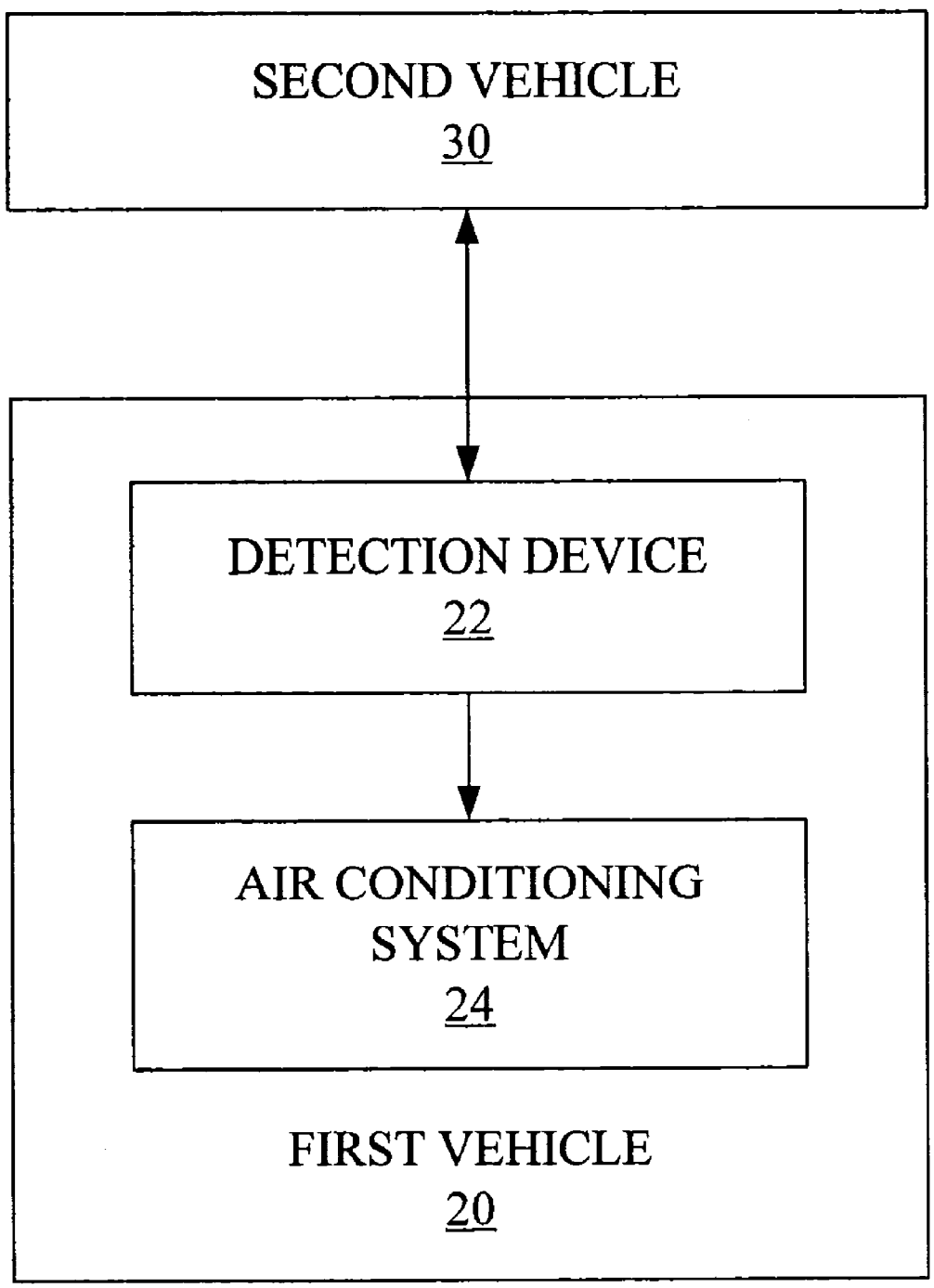
FIG. 2 is a block diagram of the two vehicles with air conditioning systems of FIG. 1.

Referring to FIG. 1 and FIG. 2, a first vehicle 20 and a second vehicle 30 are illustrated. The first vehicle 20 includes a detection device 22 and an air conditioning system 24. The detection device 22 is located in a front end of the first vehicle 20, and determines whether another vehicle, such as the second vehicle 30, is within a predetermined distance of the first vehicle 20. The detection device 22 may be an ultrasonic transducer or a video camera. The predetermined distance is preset to, for example, two or three meters (m), and is fully adjustable according to preference. When the second vehicle 30 is determined to be within the predetermined distance, the detection device 22 alerts the air conditioning system 24 by transmission of a signal thereto.

The air conditioning system 24 is installed in the first vehicle 20, electrically coupled to the detection device 22. The air conditioning system 24 operates between ventilation and recirculation modes. In ventilation mode, an inside air inlet is closed and an outside air inlet is opened, drawing fresh air into the interior of the vehicle 20, and in recirculation mode, the inside air inlet is opened and the outside inlet closed, to recirculate air inside the interior of the first vehicle 20.

The air conditioning system 24 switches to recirculation mode in response to the signal received from the detection device 22. When no signal has been received from the detection device 22, the air conditioning system 24 switches/remains in the ventilation mode.

Figure 3:
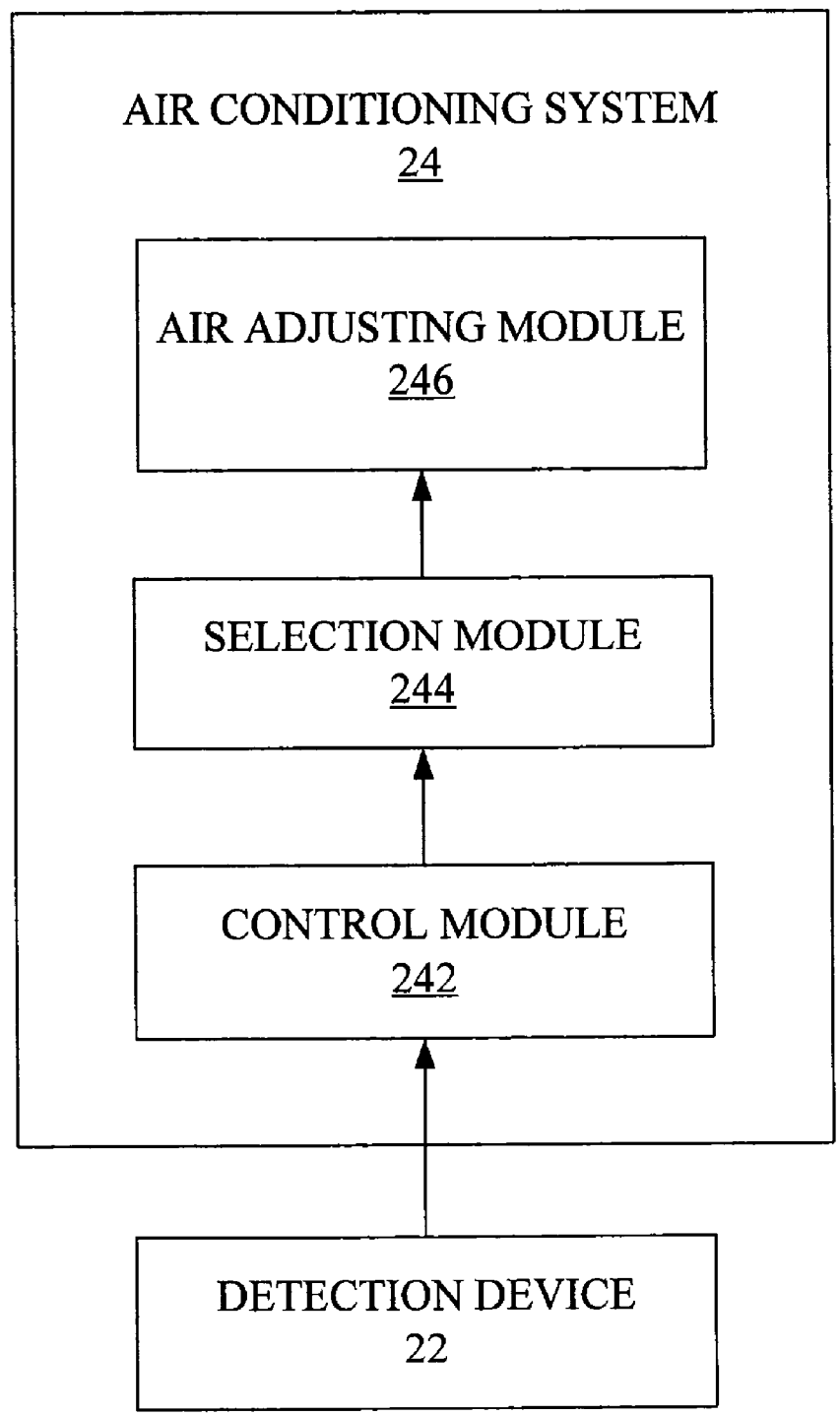
FIG. 3 is a detailed block diagram of the air conditioning system of FIG. 1 in accordance with a first embodiment.

FIG. 3 is a detailed block diagram of the air conditioning system 24. The air conditioning system 24 includes a control module 242, a selection module 244, and an air adjusting module 246. The control module 242 directs the selection module 244 to select an operating mode for the air adjusting module 246. When the signal is received from the detection device 22, the control module 242 directs the selection module 244 to select the recirculation mode from the air adjusting module 246. When no signal is received from the detection device 22, the control module 242 directs the selection module 244 to select the ventilation mode for the air adjusting module 246.

Figure 4:
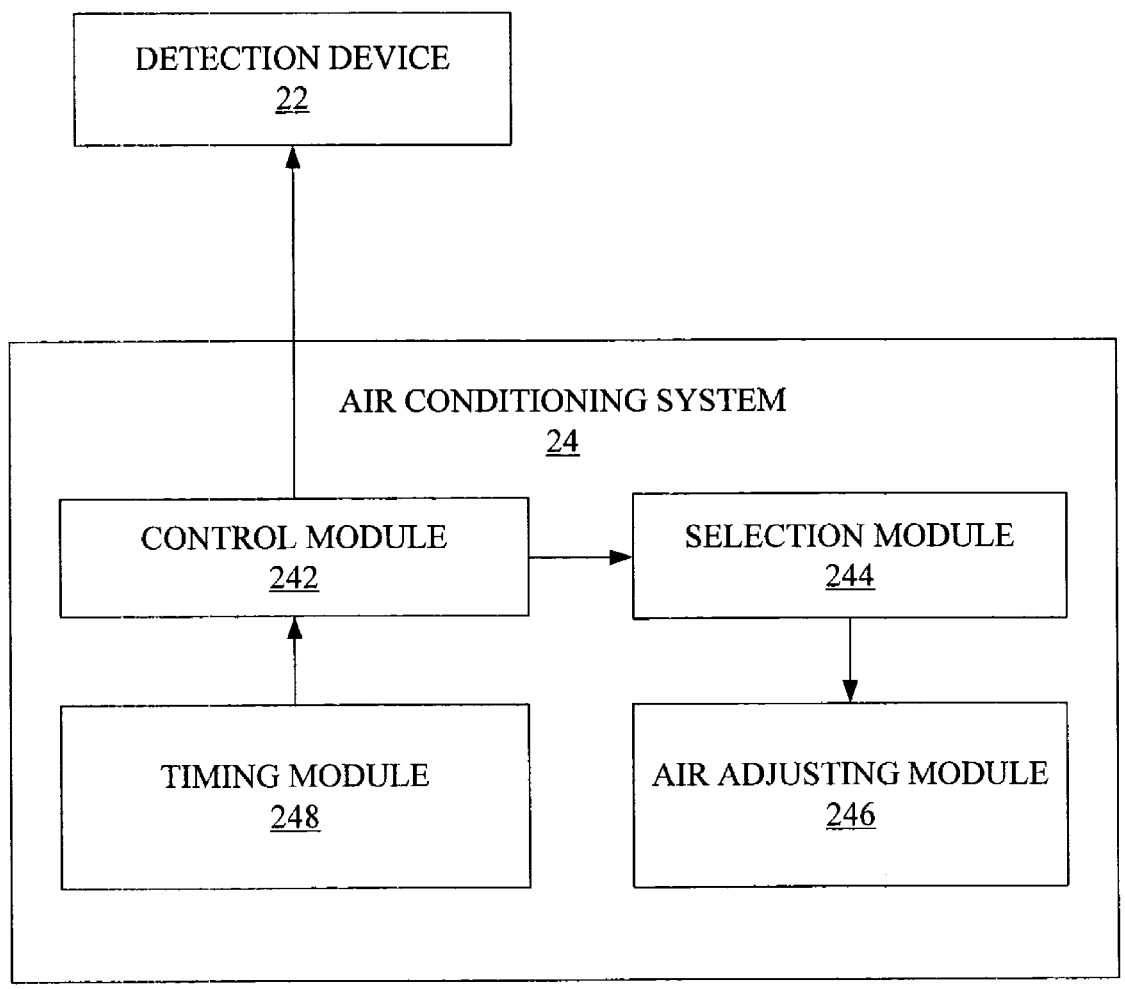
FIG. 4 is a detailed block diagram of the air conditioning system of FIG. 1 in accordance with a second embodiment.

Referring to FIG. 4, in a second embodiment, the air conditioning system 24 can further include a timing module 248. The timing module 248, which may be a timer, triggers the control module 242 to determine if the signal is incoming from the detection device 22 in a predetermined time interval, such as two minutes or three minutes. If, after the predetermined time interval, no signal is incoming from the detection device 22, the control module 242 directs the selection module 244 to select the ventilation mode for the air adjusting module 246.

As described, the first vehicle 20 automatically switches to the recirculation mode when the second vehicle 30 is detected within a predetermined distance. Thus, emissions discharged from the second vehicle 30 are prevented from being drawn into the inside of the first vehicle 20.

Figure 5:
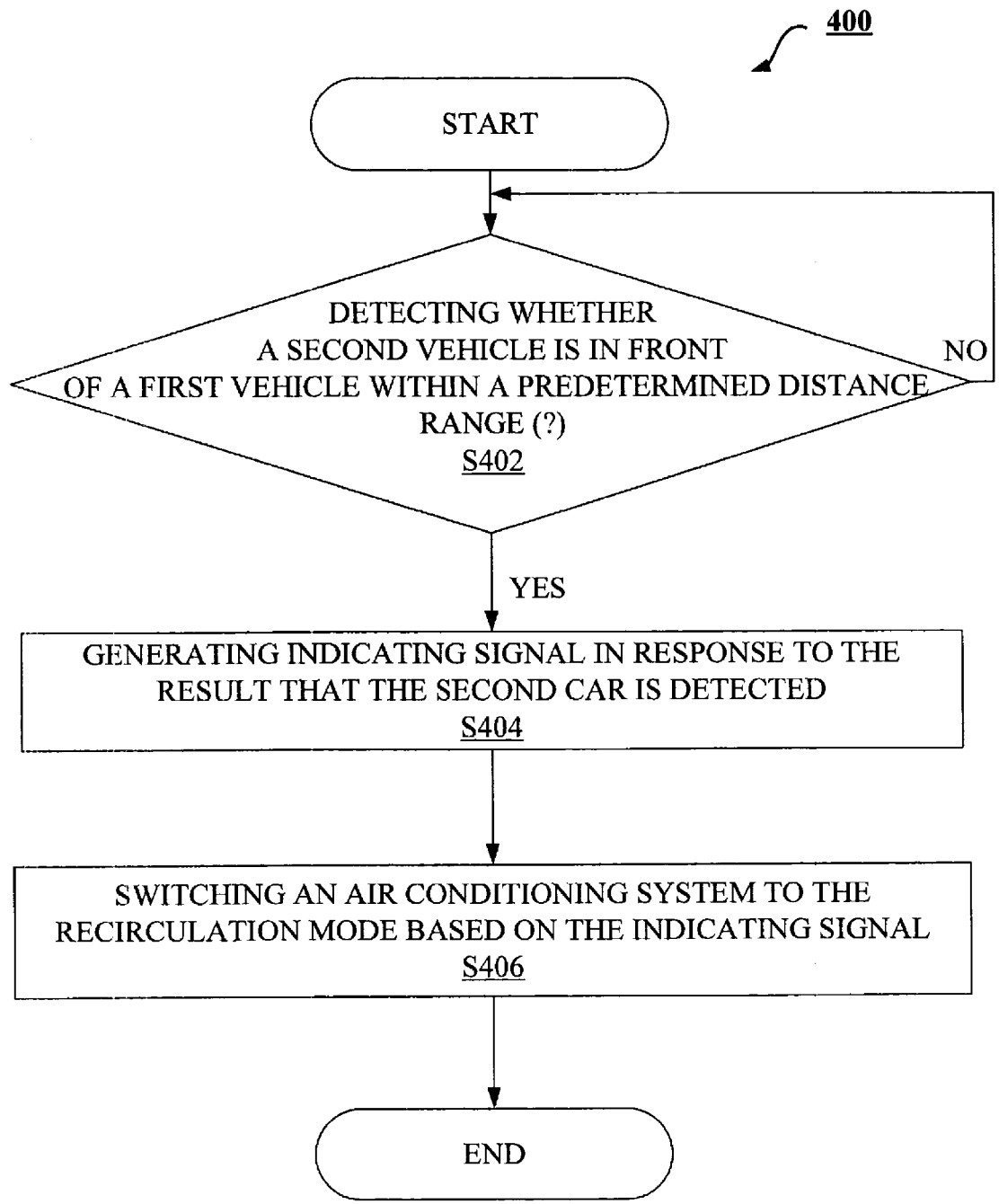
FIG. 5 is a flowchart of a method implemented by the air conditioning system for preventing intake of emissions in accordance with a first embodiment.

Referring to FIG. 5, a method 400 of operating an air conditioning system according to a first embodiment is illustrated. The method 400 includes the following steps.

In step S402, the detection device 22 determines whether a second vehicle 30 is within a predetermined distance of the first vehicle 20. If so, step S404 is implemented. If not, the first step S402 is repeated.

In step S404, the detection device 22 sends a signal to the air conditioning system 24 indicating the second vehicle 30 is within the predetermined distance.

In step S406, the air conditioning system 24 switches to the recirculation mode.

Figure 6:
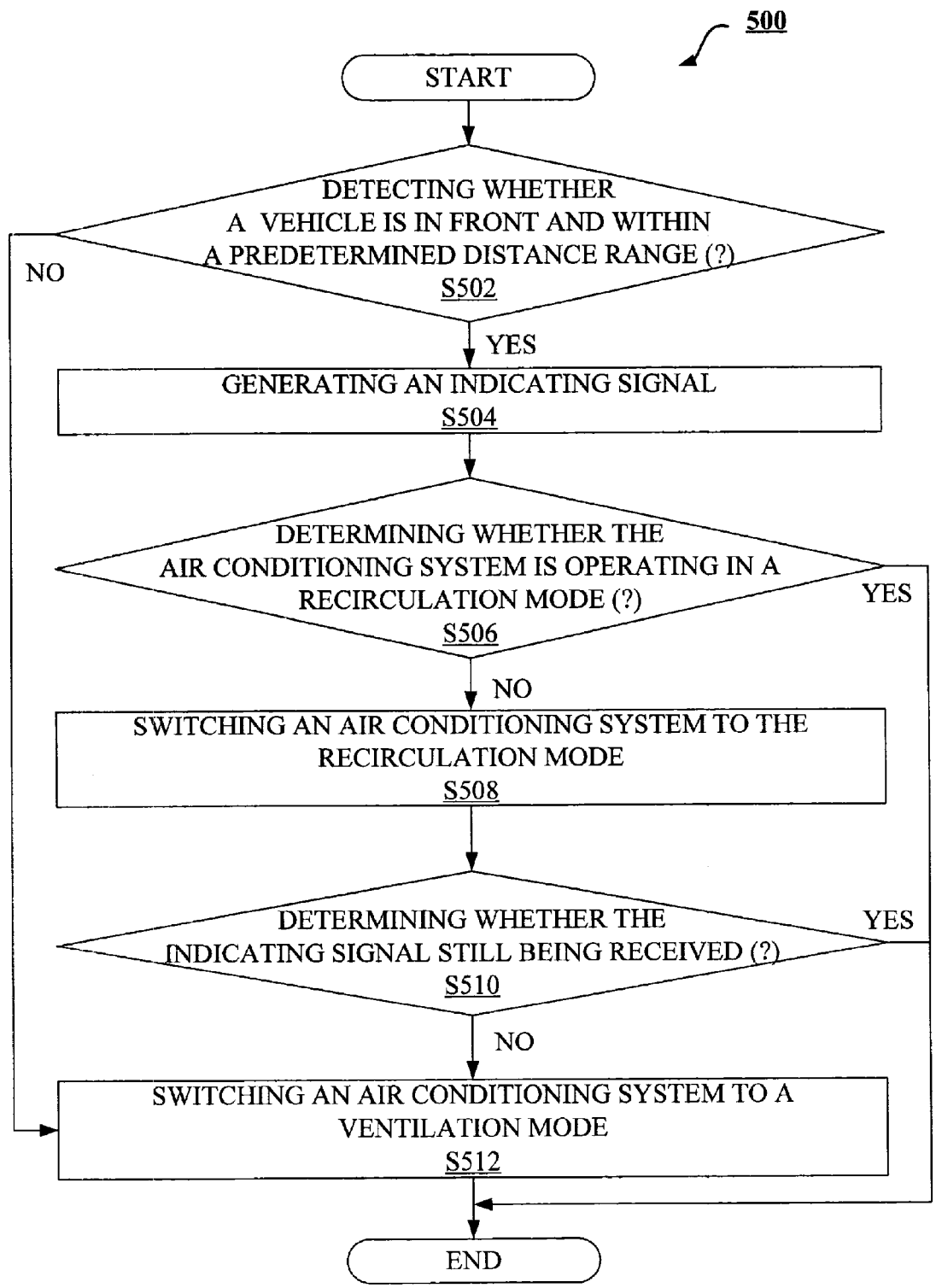
FIG. 6 is a flowchart illustrating a method implemented by the air conditioning system for preventing intake of emissions in accordance with a second embodiment.

Referring to FIG. 6, a method 500 of operating an air conditioning system according to a second embodiment is shown. The method 500 includes the following steps.

In step S502, the detection device 22 determines whether a second vehicle 30 is within a predetermined distance of the first vehicle 20. If so, step S504 is implemented. If not, step S512 is repeated.

In step S504, the detection device 22 sends a signal to the air conditioning system 24 indicating that the vehicle 30 is within the predetermined distance.

In step S506, the first vehicle 20 determines whether the air conditioning system 24 is currently in the recirculation mode. If so, step S510 is implemented. If not, step S508 is implemented.

In step S508, the air conditioning system 24 switches to the recirculation mode.

In step S510, the air conditioning system 24 determines whether a signal is incoming from the detection device 22 after a predetermined time interval. If so, the procedure finishes. If not, step S512 is implemented.

In step S512, the air conditioning system 24 switches to the ventilation mode.

According to the methods disclosed, the air conditioning system 24 of the vehicle 20 switches to the recirculation mode when the vehicle 30 is determined to be within the predetermined distance. Thus, the emissions discharged from the vehicle 30 are prevented from being drawn into the interior of the vehicle 20.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An air conditioning system installed in a vehicle, providing cooled air to the vehicle, the air conditioning system comprising:
   a detection device detecting whether another vehicle is present in front of the vehicle within a predetermined distance, the detection device sending a signal when the another vehicle is detected;
   a control module coupled to the detection device receiving the signal transmitted from the detection device; and
   an air adjusting module switching the system between ventilation and recirculation modes;
   wherein the control module, upon receiving the signal indicating that another vehicle is in front of the vehicle within the predetermined distance, directs the air adjusting module to operate in the recirculation mode.

2. The air conditioning system according to claim 1, further comprising:
   a selection module directed by the control module to select the recirculation mode for the air conditioning system when the signal is received from the detection device.

3. The air conditioning system according to claim 2, further comprising:
   a timing module triggering the control module to determine whether the signal is incoming after a predetermined time interval.

4. The air conditioning system according to claim 3, wherein the control module directs the selection module to select the ventilation mode for the air adjusting module when no signal is received from the detection device after the predetermined time interval.

5. The air conditioning system according to claim 1, wherein the detection device is located in a front end of the vehicle.

6. The air conditioning system according to claim 1, wherein the detection device is an ultrasonic transducer.

7. The air conditioning system according to claim 1, wherein the detection device is a video camera.

8. A vehicle comprising:
   an air conditioning system alternatingly operating in a ventilation mode drawing fresh air into the vehicle and a recirculation mode recirculating air through the interior of the vehicle; and
   a detection device attached to the vehicle and coupled to the air conditioning system, detecting whether another vehicle is in front of the vehicle within a predetermined distance, and sending a signal to the air conditioning system, in response to which the air conditioning system switches to the recirculation mode.

9. The vehicle according to claim 8, wherein the air conditioning system switches to the ventilation mode if no signal is received from the detection device for a predetermined time interval.

10. The vehicle according to claim 8, wherein the detection device is located in a front end of the vehicle.

11. The vehicle according to claim 8, wherein the detection device is an ultrasonic transducer.

12. The vehicle according to claim 8, wherein the detection device is a video camera.

13. A method for switching an air conditioning system installed in a vehicle between ventilation and recirculation modes, the method comprising:
   detecting whether another vehicle is in front of the vehicle within a predetermined distance;
   sending a signal indicating that the other vehicle is in front of the vehicle within the predetermined distance; and
   switching the air conditioning system to the recirculation mode.

14. The method according to claim 13, further comprising:
   determining whether the signal is incoming after a predetermined time interval;
   switching the air conditioning system to the ventilation mode upon determination that no signal is received after the predetermined time interval.

* * * * *